Patented Aug. 31, 1943

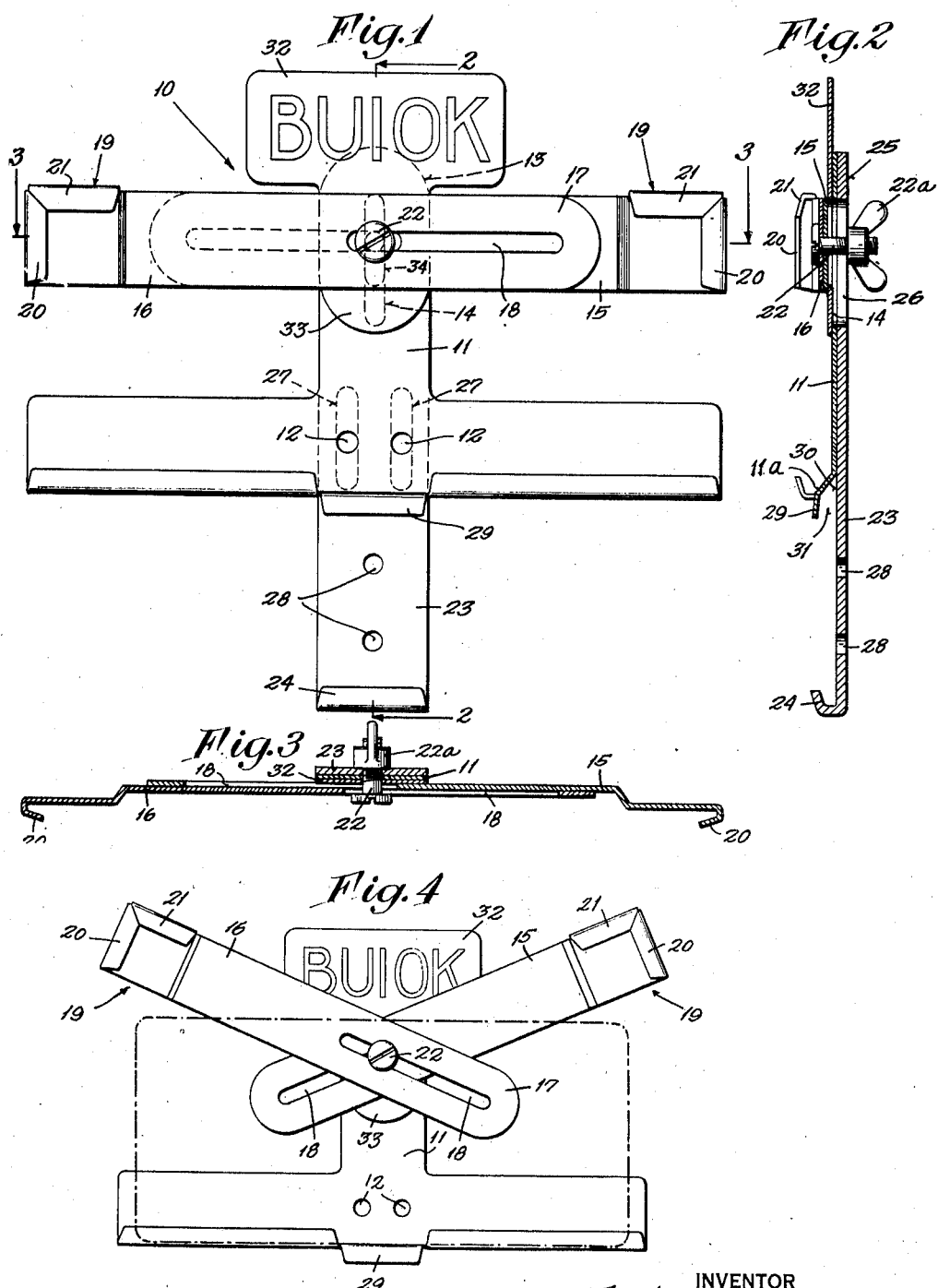

2,328,252

UNITED STATES PATENT OFFICE 2,328,252

PLATE HOLDER

Frederick W. Barker, Pound Ridge, N. Y.

Application November 8, 1940, Serial No. 364,779

4 Claims. (Cl. 40—125)

This invention relates to plate holders, and particularly to plate holders having adjustable members adaptable to grip all sides of different sizes of rectangular plates. To facilitate an understanding of the present invention, and because the holders provided by the present invention appear to be especially useful for holding automobile license plates, it will be described hereinafter as a license plate holder.

License plates are conventionally of such thin material that corners and edges frequently become bent with relatively small forces. When license plates are bent, the appearance of the car is seriously marred. Moreover, the criminal statutes of some States provide penalties for owners of cars having license plates which cannot be easily read. Accordingly, it is highly important that a license plate be mounted in such a manner as to minimize the likelihood of the edges, and especially the corners, being bent and damaged.

A license plate is ordinarily made of such flexible material that in use it tends to function as a vibrating member unless it is restrained firmly at all sides. When a license plate is mounted, as for example, in such a manner as to be held only on a single edge, the plate is likely to vibrate to such an extent as to loosen the bolts or other securing members holding it, and/or cause an annoying rattle or vibration which may be so loud as to disturb the passengers of the automobile.

Recent years have seen an extensive increase in the number of automobiles carrying a plurality of plates, tags, and/or markers. Some trucks must carry several State license tags and/or weight tags. Some passenger cars must carry parkway toll markers, college campus markers, etc., and/or identification markers such as those indicating membership in the American Medical Society or other privileged groups. Because there no longer is the radical differences in appearance which characterized the individual cars of the several manufacturers some years ago, and because the average person is easily confused regarding the make of a car, especially from the rear, there has been an increasing tendency to include markers identifying the make of automobile.

Heretofore there have been divers means for mounting license plates to avoid the difficulties incident to bent corners and vibrating plates. However, none of the suggestions have been entirely satisfactory because they have either failed to prevent the troubles discussed heretofore; have been so bulky and complicated that they have been too expensive to manufacture; and/or have been so complicated in appearance as to discourage the public from purchasing the same.

It is an important object of the present invention to provide a license plate holder adapted to protect the corners and edges from bending or being damaged.

Another object of the present invention is to eliminate the vibration of the license plate and/or license plate holder.

Still another object is to provide a very simple adjustable structure capable of gripping each edge of the license plate.

An important feature of the present invention is the provision of a single securing means for holding together all of the plate-gripping members.

Another important feature is the provision of a single securing means for holding together not only the plate-gripping members but also one or more auxiliary bracket members.

Another feature of the present invention is the use of the minimum number of gripping members adapted to hold four edges of any size of rectangular plate.

Another feature of the present invention is the provision of a novel clamp suitable for mounting the plate holder upon a structure.

Another feature of the present invention is the provision of a structure so very easily and simply manufactured as to make possible the production of the holders at a very low cost.

Another feature of the present invention is the provision of so simple a structure for achieving the aforementioned objects as to overcome the consumers' prejudice to complicated gadgets.

Another feature of the present invention is the inclusion of an auxiliary bracket member and/or an auxiliary marker.

Referring now to the drawing:

Figure 1 shows a front view of a preferred form of the present invention.

Fig. 2 is a cross-section view taken on line 2—2 of Fig. 1.

Fig. 3 is a cross-section view taken on a line 3—3 of Fig. 1.

Fig. 4 is an alternative form of the present invention.

Before describing the present improvements and mode of operation thereof in detail it should be understood that the invention is not limited to the details of construction and arrangement of parts shown in the accompanying drawing, which are merely illustrative of the present preferred embodiments, since the invention is capable of other embodiments, and the phraseology employed is for the purpose of description and not of limitation.

Referring now in detail to the drawing which shows the present preferred embodiments of the invention, it will be seen that: There is provided a complete plate holder 10 including a main member 11. The plate holder 10 may, if desired, be mounted upon a structure by passing bolts or screws through holes 12 through the mounting member 11. The present invention is particularly useful for holding license plates upon automobiles and if desired bolts can be passed through the holes 12 as aforesaid to mount the holder upon the grille of an automobile. The holder is also useful for holding license plates and the like upon airplanes, boats, motorcycles, etc.

A slotted portion 13 on the main member 11 includes a slot 14 which is only long enough to permit a reasonable amount of relative adjustment vertically between the several members of the plate holder 10.

There is provided a lateral gripping member 15 adapted to securely hold one upper corner of a rectangular plate. A somewhat similar lateral gripping member 16 is adapted to securely hold the other upper corner of a rectangular plate. Each of the lateral gripping members 15 and 16 is provided with slotted portions 17 including a slot 18. A retaining element 19 is positioned on each lateral gripping member at the end opposite the slot 18. The retaining element includes not only a vertical channel 20 but also a horizontal channel 21.

The retaining element 19 and channels 20 and 21 have important advantages over conventional channels inasmuch as they grip a corner of a plate, and prevent the corner from bending or vibrating.

Of especial importance it should be noted that a single securing means, as for example a bolt 22 associated with a wing nut 22a, clamp together the main member 11 and the two lateral gripping members 15 and 16. Because the bolt 22 passes through the slots 18 of the slotted portions 17 of the lateral gripping members 15 and 16, and because the bolt 22 also passes through the slot 14 of the slotted portions 13 of the main member 11, it is possible to adjust the members 11, 15 and 16 with respect to each other. The adjustment, instead of being a complicated operation as has been true of the complex gadgets heretofore available, is a very simple process. It is only necessary to place the rectangular plate in the plate holder 10 and to swing the retaining elements 19 down upon the corners of the rectangular plate and to tighten the wing nut 22a.

The plate holder 10 may be provided with an auxiliary bracket 23 which may be positioned beneath the main member 11. The auxiliary bracket 23 may be provided with a channel 24 at the bottom edge. At the top of the auxiliary bracket is a slotted portion 25, including a slot 26. As shown best in Fig. 2, the bolt 22 passes through the slot 26 of the auxiliary bracket when it is included in the plate holder assembly 10. As may be seen from the drawing, the auxiliary bracket 23 may be adjusted vertically with respect to the bolt 22, the lateral gripping members 15 and 16 and/or the main member 11. Slots 27 adapted to coincide with the holes 12 in the main member 11 are adapted to permit relative vertical movement between the auxiliary bracket and the main member without interfering with the mounting holes 12.

For convenience in securing tags or the like to the auxiliary bracket 23 and/or for convenience in securing the auxiliary bracket to a suitable structure, there are provided holes 28. The main member 11 is provided with a centrally disposed turned-over edge 29 adapted to cooperate with a mounting surface 30 on the auxiliary bracket 23 to provide a channel 31.

It should be especially noted that the channel 24 and the channel 31, which combine to form a clamp, can be used for mounting the members 11, 15, 16 and 23 upon a bumper, strut, bracket or other element of a structure such as an automobile, motorcycle, boat or airplane. When the members 11, 15, 16 and 23 are mounted upon an automobile bumper by means of the channels 24 and 31 it is only necessary to loosen the wing nut 22a and to adjust the members 23 and 11 so that the bumper fits snugly between the channels 24 and 31, to adjust the members 11, 15 and 16 so that the plate fits snugly between the channels 19, 20 and a channel 11a on the main member 11, and to tighten the wing nut 22a. If it is not possible to make use of the channels 24 and 31 as a means for securing the holder 10 to an automobile bumper or the like, then the channels 24 and 31 can be used for mounting an additional license plate, parkway toll permit, campus marker, or other suitable marker in the clamp formed by the adjustable combination of channels 24 and 31.

The license plate holder of the present invention may also, and preferably is, provided not only with an auxiliary bracket but also with a marker 32. The marker 32 may be a personal identification marker with removable initials, a manufacturer's identification marker, a professional emblem or the like. Some campus permits, parkway toll receipts, etc., are so designed as to be adapted for use as the marker 32. The marker is provided with a slotted portion 33, including a slot 34, through which passes the bolt 22.

It should be especially noted that notwithstanding the addition of a marker, the task of assembling the entire plate holder, securing a plate therein, and mounting the assembly upon a structure such as an automobile bumper, is still the very simple operation of tightening the wing nut 22a.

As shown in Fig. 4, the plate holder may be assembled without the auxiliary bracket 23. This is especially important from the manufacturing and selling standpoint, as it makes possible the production of plate holders of several prices without any change in tools or inventory. Moreover, it permits the consumer to use, or not to use, the auxiliary bracket, as he pleases.

Obviously numerous modifications of the present invention are possible, and the above description is intended to be merely illustrative of a preferred embodiment thereof.

Having thus described the invention what is claimed as new is:

1. In a holder for a rectangular plate, the combination of a mounting member with a channel to receive the lower section of a plate, and having a vertical slot; a gripping member having a pair of channels at right angles to each other for gripping the side and top of one upper corner of a plate, and having a horizontal slot; another gripping member having a pair of channels at right angles to each other for gripping the side and top of the other upper corner of the plates, and having a horizontal slot; and one means, extending through the slots of said three members, adapted to lock said three members together and to grip all four edges of the plate.

2. In a plate holder, the combination of a main member including a slotted portion; a channel on said main member adapted to grip an edge of a plate; an overturned edge on said main member; a pair of lateral gripping members each having a slotted portion; retaining elements on each lateral gripping member adapted to grip two edges of a plate; an auxiliary bracket including a slotted portion; a channel on said auxiliary bracket adapted to engage a structure, said overturned edge and said last-named channel defining a clamp, said clamp being adapted to grip a structure; and a single securing means passing through each of said slotted portions, adapted to permit the relative adjustment of said lateral gripping members, main member and clamp.

3. In a plate holder, the combination of a main member including a slotted portion; a channel on said main member adapted to grip an edge of a plate; an overturned edge on said main member; a pair of lateral gripping members each having a slotted portion; a retaining element on each lateral gripping member adapted to grip a corner of a plate; a marker having a slotted portion; an auxiliary bracket having a slotted portion; a channel on said auxiliary bracket, said channel on said auxiliary bracket and said overturned edge on said member combining to constitute a clamp; and a single securing means pressing through each of said slotted portions, adapted to adjustably hold said main member, lateral gripping members, clamp, marker and auxiliary bracket together.

4. In a plate holder, the combination of a main member including a slotted portion; a channel on said main member adapted to grip the bottom edge of a plate; an overturned edge on said main member; an auxiliary bracket including a slotted portion; a bottom channel on the auxiliary bracket adapted to grip the bottom edge of a structure, said channel on the auxiliary bracket and said overturned edge on said main member combining to constitute a clamp adapted to grip a structure; a pair of lateral gripping members, each having a slotted portion; a retaining element on each lateral gripping member; horizontal and vertical channels on said retaining element adapted to grip horizontal and vertical edges of a plate; a marker positioned above the lateral gripping members, said marker including a slotted portion; a bolt passing each of said slotted portions adapted to adjustably hold said main member, lateral gripping members, clamp, marker and auxiliary bracket; and a nut on the bolt.

FREDERICK W. BARKER